United States Patent [19]
Tran

[11] Patent Number: 5,942,164
[45] Date of Patent: Aug. 24, 1999

[54] COMBINED HEAT AND MASS TRANSFER DEVICE FOR IMPROVING SEPARATION PROCESS

[75] Inventor: Thanh Nhon Tran, Flossmoor, Ill.

[73] Assignee: The United States of America as represented by the United States Department of Energy, Washington, D.C.

[21] Appl. No.: 08/906,838

[22] Filed: Aug. 6, 1997

[51] Int. Cl.$^6$ ........................................................ B01F 3/04
[52] U.S. Cl. .......................... 261/128; 165/60; 261/148; 261/155; 261/156; 261/114.1
[58] Field of Search ..................... 261/127, 128, 261/148, 152, 155, 156, 114.1; 165/60

[56] References Cited

U.S. PATENT DOCUMENTS

| | | | |
|---|---|---|---|
| 889,201 | 6/1908 | Clark | 261/155 |
| 2,345,319 | 3/1944 | Bertram et al. | 261/148 |
| 2,690,060 | 9/1954 | Legatski | 261/148 |
| 2,833,527 | 5/1958 | Kohl et al. | 261/148 |
| 3,148,516 | 9/1964 | Kals | 165/60 |
| 3,349,839 | 10/1967 | Priestley | 261/148 |
| 3,711,070 | 1/1973 | Khokhlov et al. | 261/148 |
| 3,792,842 | 2/1974 | Nakako et al. | 261/148 |
| 3,792,843 | 2/1974 | Stage | 261/148 |
| 4,025,398 | 5/1977 | Haselden | 261/148 |
| 4,171,335 | 10/1979 | Planovsky et al. | 261/155 |
| 4,477,396 | 10/1984 | Wilkinson | 261/155 |
| 5,034,103 | 7/1991 | Hamer et al. | 202/158 |
| 5,282,365 | 2/1994 | Victor et al. | 62/22 |
| 5,296,103 | 3/1994 | Masetto | 203/1 |
| 5,303,769 | 4/1994 | Hoegberg | 165/108 |
| 5,489,366 | 2/1996 | Jongenburger | 203/14 |
| 5,618,473 | 4/1997 | Sauter et al. | 261/114.1 |

OTHER PUBLICATIONS

*Integral Combined Heat and Mass Transfer for Improving Efficiency/Control of Distillation*, Research Proposal by Thanh N. Tran and Martin W. Wambsganss, Internal Distribution only on Jun. 8, 1996; Presented to Dow Chemical Corp. On Nov. 11, 1996.

*Heat Exchangers for the Future*, The Chemical Engineer, Jun. 10, 1993.

Argonne Scientists Overcoming Barriers to New Applications of Compact Heat Exchangers, Aug. 17, 1994.

*Primary Examiner*—C. Scott Bushey
*Attorney, Agent, or Firm*—Lisa M. Solitis; Mark P. Dvorscak; William R. Moser

[57] ABSTRACT

A two-phase small channel heat exchange matrix simultaneously provides for heat transfer and mass transfer between the liquid and vapor phases of a multi-component mixture at a single, predetermined location within a separation column, significantly improving the thermodynamic efficiency of the separation process. The small channel heat exchange matrix is composed of a series of channels having a hydraulic diameter no greater than 5.0 millimeters for conducting a two-phase coolant. In operation, the matrix provides the liquid-vapor contacting surfaces within the separation column, such that heat and mass are transferred simultaneously between the liquid and vapor phases. The two-phase coolant allows for a uniform heat transfer coefficient to be maintained along the length of the channels and across the surface of the matrix. Preferably, a perforated, concave sheet connects each channel to an adjacent channel to facilitate the flow of the liquid and vapor phases within the column and to increase the liquid-vapor contacting surface area.

7 Claims, 5 Drawing Sheets

COMBINED HEAT AND MASS TRANSFER DEVICE FOR IMPROVING SEPARATION PROCESS

CONTRACTUAL ORIGIN OF THE INVENTION

The United States Government has rights in this invention pursuant to Contract Number W-31-109-ENG-38 between the United States Government and Argonne National Laboratory.

BACKGROUND OF INVENTION

1. Field of the Invention

The present invention relates to a small channel heat exchanger, and more particularly, to a two-phase small channel heat exchange matrix that provides for simultaneous heat transfer and mass transfer at a single, predetermined location in a separation column, whereby the thermodynamic efficiency of the separation process is significantly improved.

2. Background of the Invention

Separation processes are an integral part of chemical manufacturing and petroleum refining operations. In these industries, a large percentage of the energy consumed and capital expended is associated with the critical steps of refining and product recovery. Many separation processes are known, including distillation, absorption, membrane separation, evaporation, liquid-liquid extraction, and crystallization. Distillation, which involves the separation of components on the basis of their relative volatility, is the product recovery and purification technology most often used.

Distillation involves the separation of the components of a feed solution by countercurrently contacting a rising vapor phase with a downwardly flowing liquid phase. During the countercurrent contact, the more volatile components of the feed solution are stripped from the liquid phase by the hot rising vapor, and the less volatile components of the mixture are stripped and condensed from the vapor phase by the cold descending liquid. In the majority of distillation systems, some of the condensed vapor is returned to the upper rectifying section of the column for a continuous downward liquid flow. The condensed vapor returned to the column is referred to as liquid reflux. The feed solution is generally introduced into the column between the upper rectifying section and the lower stripping section.

A conventional distillation apparatus includes at least one column containing vapor-liquid contacting elements, such as packing or trays, that provide the surface areas within the column for the mass transfer between the vapor and liquid phases of the feed solution. Packing can be structured or random, including a structured honeycomb configuration of sheet metal or single honeycomb cells, glass beads, or ceramic rings. Trays are substantially flat plates placed horizontally at preselected heights within the column. Trays having caps, valves, and/or perforations can further be equipped with liquid distributors and/or liquid inlet/outlet ports, and are often used in conjunction with liquid downcomers that facilitate the flow of liquid from an upper to a lower tray.

The mass transfer between the vapor and liquid phases is facilitated by the vapor-liquid contacting elements, which provide surface areas for the interfacing of the liquid and vapor during the countercurrent flow. In a packing-type column, the liquid flows downwardly as a film over the surfaces of the packing, contacting the vapor as it rises through the voids in the packing. In a tray-type column, the liquid collects in shallow pools on the trays and contacts the vapor as it bubbles up through the perforations. Conventionally, the packing or trays are designed to provide a surface for mass transfer only, not heat transfer.

In distillation, the mass-separating agent is energy, in the form of heat. Heat transfer is typically achieved by operating an external reboiler at the bottom of the column and an external condenser at the top of the column. The energy balance within the column is dependent upon the energy introduced into the system by the reboiler and the energy removed from the system by the condenser. As the contact between the vapor and liquid phases within the column is essentially adiabatic, the reboiler and condenser provide the energy input and output, respectively, for the heat transfer process that dictates the mass transfer between the liquid and vapor phases.

The operating variables of a distillation column include the temperature and feed rate of the feed solution, and the amount of heat generated by the reboiler and removed by the condenser. Importantly, precise control of the operating variables is required to regulate the local working conditions of the column which are determinative of the equilibrium state and thermodynamic efficiency of the column as a whole. For example, the local equilibrium temperature at different points within the column determines the local saturation pressure, which influences the mass transfer between the vapor and liquid phases. Changing the local equilibrium temperature changes the amount of vapor and liquid available for condensation and evaporation, respectively. During normal operation, when the flow of liquid and vapor are not at the proper local flow rates, excessive flooding of liquid (weeping) occurs, which impairs the effectiveness of the vapor-liquid contacting elements and the efficiency of the mass transfer between the vapor and liquid phases. The improper balance of vapor flow and liquid flow over the length of the column causes the reboiler and condenser to work harder, requiring more energy to maintain the column in an equilibrium state. Thus, problems associated with distillation columns are the inability to precisely control the conditions within the column and the inherent energy inefficiency of the column design.

A common approach that addresses the need to control the local working conditions of the column includes distributing the heating and/or cooling along the length of the column rather than supplying all the heat in the reboiler at the bottom of the column and removing all the heat at the top in the overhead condenser. Current heat exchanger designs are too great a size to be located internally within the column, and are instead provided externally, including supporting structures. For example, heat exchangers can be positioned at intermediate points outside of the column, whereby liquid is drawn off at a certain column height, pumped to the heat exchanger, heated, and returned to the column. This solution, however, requires a more complex and expensive column design, increasing capital and maintenance costs. Also, energy is lost along the auxiliary path. Most importantly, the external heat exchanger design accommodates only heat transfer and not mass transfer between the liquid and vapor phases.

A need exists for an intermediate heat exchange mechanism that is an integral part of the distillation column, such that heat transfer and mass transfer are accomplished simultaneously and at the same location within the column.

The present invention, a two-phase small channel heat exchange matrix, involves a distillation column design incorporating small channel heat exchange technology that overcomes the energy inefficiency and equilibrium control problems experienced in the prior art. The matrix is also simple to construct and maintain, and adaptable to diverse separation applications. The matrix is comprised of a series of small tubes or channels for transporting a two-phase coolant. Each channel has an exterior surface, an interior surface through which the coolant flows, and a hydraulic diameter no greater than 5.0 mm. The channels are sufficiently spaced apart to allow vapor to ascend between adjacent channels within the matrix. In operation, liquid flows across and/or downwardly along the external channel surfaces, as vapor flows upwardly between the channels. The external surface areas of the channels are the liquid-vapor contacting elements upon which the mass transfer between the liquid and vapor phases occurs. At the same time, a two-phase coolant is circulated through the interior of the small channels to maintain a desired temperature and uniform heat transfer across the matrix.

The matrix is positioned inside the distillation column at a predetermined height, and the temperature of the coolant flowing through the channels of the matrix is monitored to control the local temperature and pressure within the column. In this way, mass transfer and heat transfer are achieved locally and simultaneously. Mass transfer is facilitated by providing vapor-liquid contacting surfaces in the form of the outside surfaces of the individual cooling channels comprising the matrix. Heat transfer is facilitated by introducing heat or cooling via the fluid flowing through the matrix channels, resulting in a much higher heat transfer surface-area-density ratio ($\leq 1000$ $m^2/m^3$) and more uniform heat distribution.

Importantly, the matrix minimizes the change in entropy of the liquid-vapor system within the column by controlling the change in local temperatures and saturation pressures, as well as the change in velocity of the liquid and vapor flow. Thus, partial condensation and vaporization occurs at a higher rate than in the conventional designs. The matrix minimizes entropy and achieves greater thermodynamic reversibility, resulting in a more energy efficient distillation process.

The matrix increases the energy efficiency of the column because heat and mass transfer are accomplished in one step, resulting in improved separation efficiency per unit power consumption. The matrix also promotes internal liquid reflux as a result of the ability to vary the local equilibrium along the height of the column. Thus, condensed vapor (liquid reflux) is continuously returned to the system internally. The more energy efficient design allows for a single column to be used, contributing to process plant intensification and a reduction in capital expenditures, as the need to route liquid and vapor to external columns, reboilers, condensers, and heat exchangers may be eliminated.

The matrix further allows precise control of the local equilibrium state, overcoming the inherent control problems associated with start-up and upset conditions experienced in conventional column designs. Importantly, temperature is controlled locally, at several points within the column, even in large scale separation processes. By regulating the pressure and the temperature of the coolant loop system, the velocity and the phase of the coolant flowing through the small channels can be controlled, and the local column equilibrium can be maintained at a desired value. Precise heat control of the local equilibrium state also enables more accurate management of the cut point temperature, resulting in a higher quality product. Furthermore, column failures caused by the improper balance of mass transfer within the column are prevented, or, alternatively, quickly detected and corrected. Such rapid response to pressure changes within the column and upset conditions precludes the need to wait for the entire column to establish equilibrium before modifications to the column can be made.

Finally, the invented two-phase small channel heat exchange matrix simplifies column design and allows for the universal application of the matrix in existing separation columns without restricting the use of the column to the particular separation for which the column was initially designed. In conventional column designs, the number and configuration of trays or packing, the reboiler capacity, incorporation of auxiliary heat exchangers, feed stream composition, and quantity and quality of the final product must all be carefully considered and are determinative of the cost of the separation process. The matrix, however, is a universal design which can be retrofit into existing separation columns at one or more predetermined column heights. By using the matrix, smaller columns may replace more complex systems, and reliance on overhead condensers and/or reboilers can be reduced. Control instrumentation can be simplified and more economically designed to accommodate local changes in column equilibrium. The matrix also allows for additional draw-off points of products at each particular cut-point.

Therefore, in view of the above, a basic object of the present invention is to provide to a two-phase small channel heat exchange matrix that improves the energy efficiency and allows precise control of the local equilibrium conditions of a separation process.

Another object of the invention is to provide a two-phase small channel heat exchange matrix that provides for heat transfer and mass transfer simultaneously and at a single location within a separation column.

Another object of the invention is to provide a two-phase small channel heat exchange matrix that minimizes the change in entropy within a separation column.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

Briefly, the two-phase small channel heat exchange matrix is comprised of a series of small channels for transporting a two-phase coolant. The channels have a hydraulic diameter no greater than 5.0 mm and are sufficiently spaced apart to allow vapor to ascend across and between adjacent channels within the matrix. In operation, liquid flows across and/or downwardly along the exterior channel surfaces, as vapor flows upwardly and between adjacent channels. A single matrix is positioned within a separation column, or alternatively, several matrices can be stacked together within a separation column to provide the required heat transfer and mass transfer surface area.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE INVENTION

The present invention relates to a small channel heat exchanger, and more particularly, to a two-phase small channel heat exchange matrix that provides for simultaneous heat transfer and mass transfer at a single location in a separation column, whereby the thermodynamic efficiency of the separation process is significantly improved.

Figure 1:
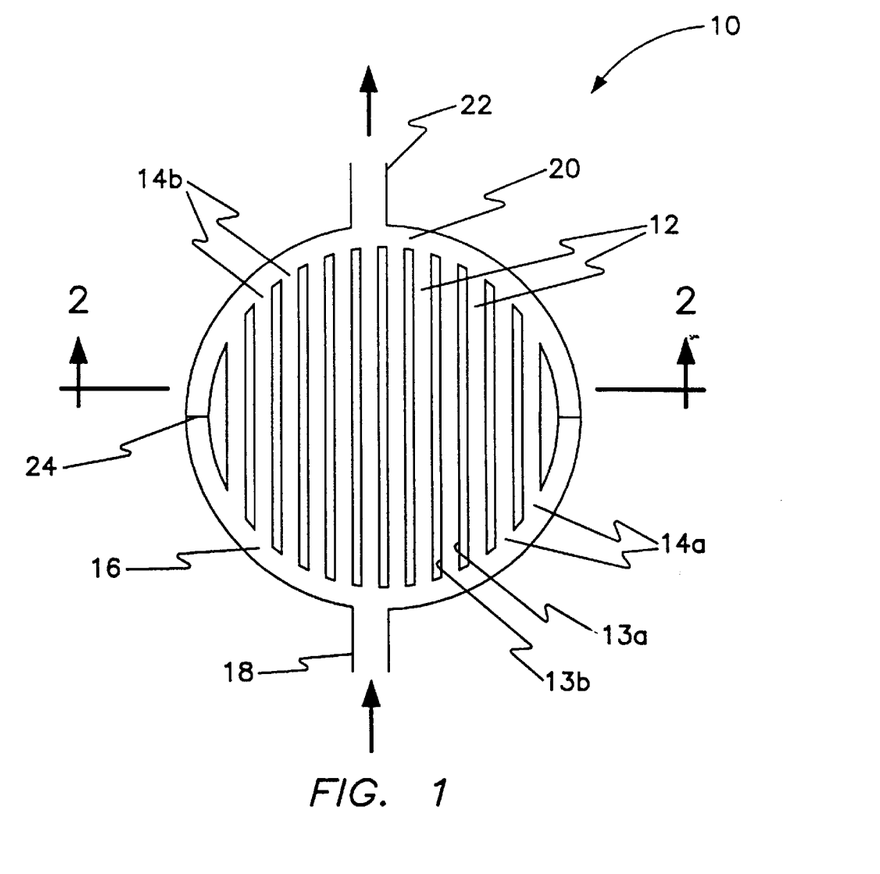
FIG. 1 shows the two-phase small channel heat exchange matrix.

FIG. 1 shows a two-phase small channel heat exchange matrix 10. The matrix 10 is comprised of a series of small channels 12, or tubes, for transporting a coolant. The channels are circular or non-circular, and are constructed of a material appropriate for the process stream (feed solution) and operating conditions of the particular distillation process. Each channel 12 has an internal surface 13a, an external surface 13b, and a predetermined length. The coolant flows inside the channels 12, each channel having a hydraulic diameter no greater than 5.0 mm, and preferably about 2.5 mm. The channels 12 are positioned within the matrix 10 such that each channel is substantially parallel to an adjacent channel, whereby the channels are aligned lengthwise one to another. Thus, the series of channels 12 are positioned in substantially the same plane. The channels 12 are sufficiently spaced apart to allow the vapor ascending in a separation column to pass between adjacent channels within the matrix 10. The first ends 14a of the channels 12 are in fluid communication with an inlet header 16, which is connected to a coolant line 18 for supplying coolant to the channels 12. The second ends 14b of the channels 12 are in fluid communication with an outlet header 20, which is connected to a coolant line 22 for receiving coolant from the channels 12. Baffles 24 separate the inlet header 16 and the outlet header 20, partitioning the path of the fluid and also providing structural support to the matrix 10.

In operation, liquid flows across and/or downwardly along the external channel surfaces 13b, as vapor flows upwardly and between the adjacent channels. Thus, when the counter-currently flowing liquid and vapor phases are in contact along the external surface areas of the channels, mass transfer between the liquid and vapor phases occurs. At the same time, the heat transfer between the coolant and the feed solution is maintained uniformly over the surface area of the matrix due to the unique phase change heat transfer process in small channels. Since the heat transfer process is efficiently and uniformly maintained, a reduction in the loss of energy caused by entropy generation within the column is achieved. The vapor mixture ascending through the column and between the channels of the matrix is partially condensed and rectified, resulting in internal reflux without the need for an overhead condenser. Importantly, the matrix provides the means for cooling the process stream at the same time and place that mass transfer is occurring.

The coolant is circulated in a closed loop consisting of either a condenser and pump or a condenser and compressor. Preferably, the coolant is a two-phase, evaporating coolant. Heat released from the upwardly flowing vapor vaporizes the coolant within the small channels of the matrix. Thus, the coolant begins in a liquid phase and transfers to a vapor phase by absorbing the heat from the rising vapor mixture within the column. Cooling by evaporating a fluid has the advantage of providing a coolant temperature (saturation temperature) that can be quickly, easily, and accurately set to a desired value by regulating the coolant loop system pressure. The cooling loop is designed to pump heat from one location in the column to another, such that equilibrium along the column can be established quickly, preventing the unnecessary over or under condensing of vapor which results in "flooding" or "weeping", respectively.

Figure 2:
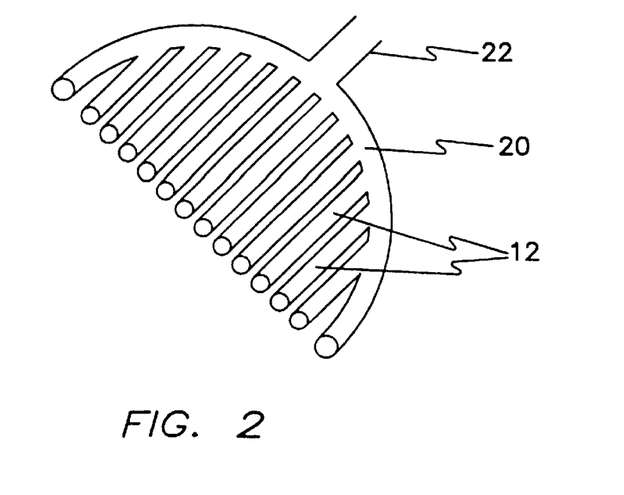
FIG. 2 shows a cross section of the two-phase small channel heat exchange matrix.

FIG. 2 shows a cross sectional view of the two-phase small channel heat exchange matrix.

Figure 3:
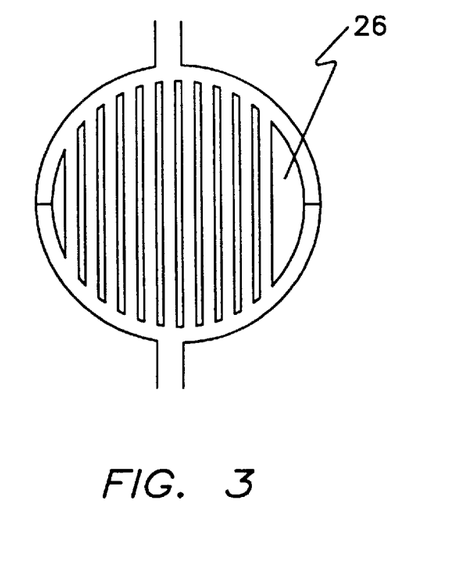
FIGS. 3, 4, and 5 show alternate embodiments of the two-phase small channel heat exchange matrix, including liquid downcomers.
Figure 4:
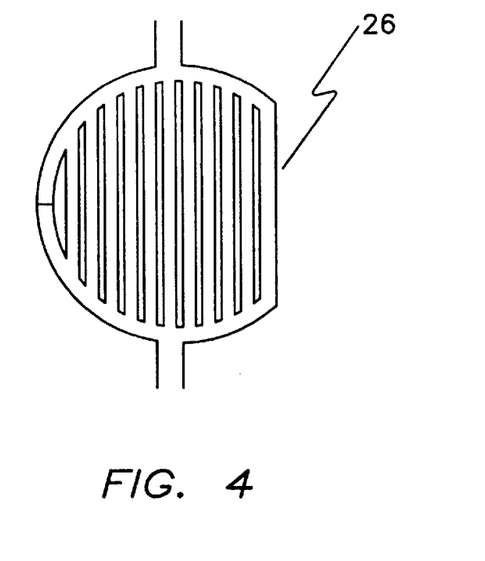
Figure 5:
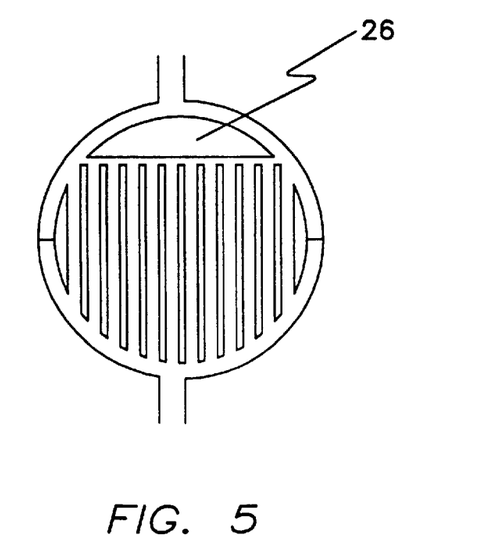
Figure 6:
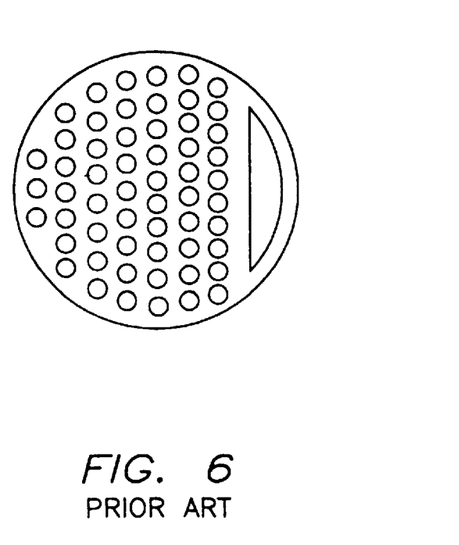
FIG. 6 shows a conventional tray, including a liquid downcomer.

FIGS. 3, 4, and 5 show alternate embodiments of the two-phase small channel heat exchange matrix 10, incorporating spaces 26 in the matrix that function as conventional liquid downcomers, allowing the liquid descending in the column to more easily flow downwardly through the column. In FIG. 4, the matrix is truncated on at least one side and along the periphery of the matrix to create the space 26, or downcomer, in close proximity to the column wall. FIG. 6 shows a conventional tray having a downcomer, which may be used in conjunction with the matrices. Additional matrix designs include providing spaces within the structure of the inlet and outlet headers and/or alternating the positioning of spaces on adjacent upper and lower matrices or liquid-vapor contacting structures within the separation column to facilitate cross flow of the liquid as it descends through the column.

Figure 7:
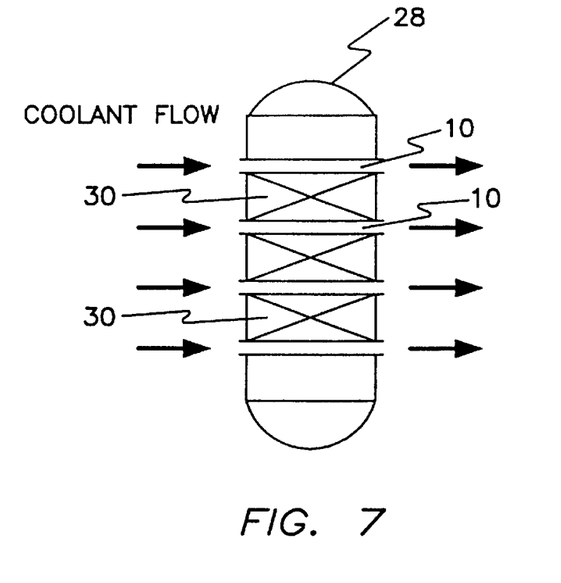
FIGS. 7 and 8 show a series of the two-phase small channel heat exchange matrices positioned within a separation column.

FIG. 7 shows a series of the two-phase small channel heat exchange matrices 10, as illustrated in FIG. 1, positioned within a separation column 28 containing conventional packing 30. The channels of each matrix 10 are in a horizontal plane which is perpendicular to the vertical axis of the column 28. The coolant flows through the channels and provides uniform heat transfer across the matrix.

Figure 8:
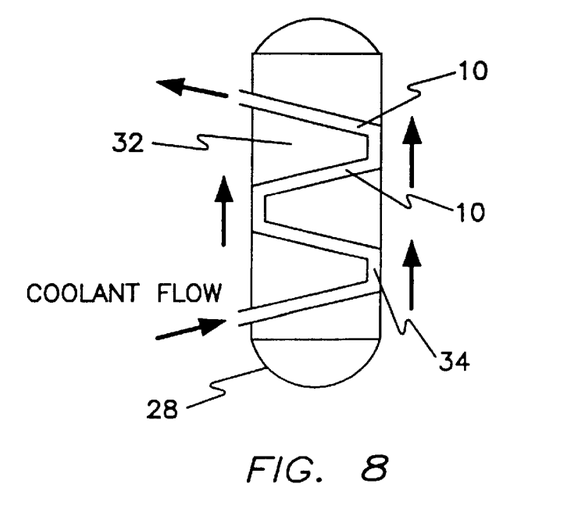

FIG. 8 shows a series of the two-phase small channel heat exchange matrices 10, as illustrated in FIG. 1, positioned within a separation column 28, such that the angle between the plane defined by the series of channels within each matrix and the vertical axis of the column is other than 90°, and preferably 45°. The matrices 10 are inclined to facilitate the downward flow of the condensate under gravity from one matrix to the next. The matrices 10 are further arranged in an alternating pattern, whereby the outlet header of one matrix is positioned in close proximity to the inlet header of an adjacent matrix. Thus, adjacent matrices form vapor spaces 32 which facilitate cross-flow relative to the surface of the liquid condensate. Each vapor space can be sized to minimize liquid entrainment in the vapor stream, thereby enhancing the quality of the final product. Adjacent matrices 10 are connected by coolant lines 34. The coolant lines connect the outlet header of a lower matrix to the inlet header of an adjacent upper matrix, so that coolant enters the column at a certain lower column height, is pumped upwardly through the column, and exits the column at a certain higher column height.

Figure 9:
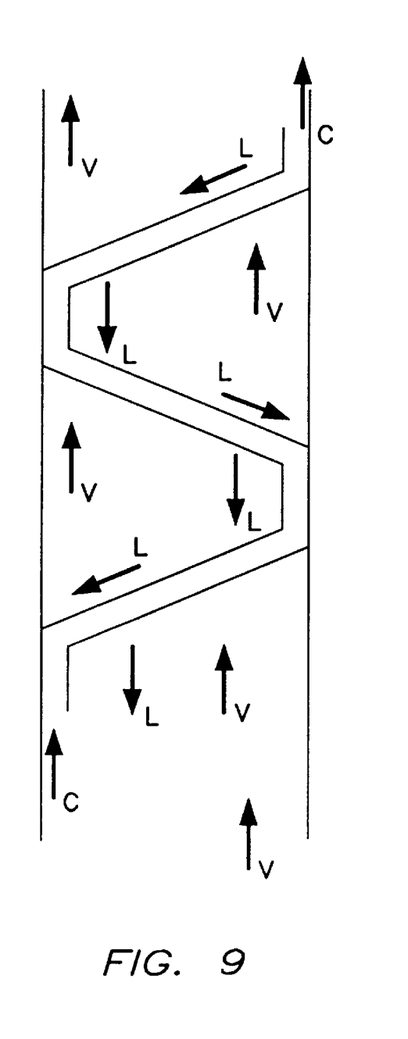
FIG. 9 shows the coolant, vapor, and liquid flow along the interior and exterior surfaces of a series of two-phase small channel heat exchange matrices positioned within a separation column.

FIG. 9 shows the coolant flow, vapor flow, and liquid flow in the interior and along the exterior surfaces of a series of two-phase small channel heat exchange matrices within a separation column. The vapor (V) ascends through the vapor spaces provided between each adjacent matrix and through the spaces provided between the each adjacent channel within each individual matrix. The liquid (L) descends as a film along the surfaces of the individual channels of each matrix and the surfaces of the inlet and outlet headers. The downward flow of the liquid (L) is further facilitated by the downcomers, which are provided in the structure of the inlet and outlet headers and/or channels. Thus, the vapor and liquid phases are in contact along the surfaces of the matrices. The coolant (C) enters the matrix array at the bottom of the column and is pumped upwardly through the matrices, exiting at the top of the column.

Figure 10:
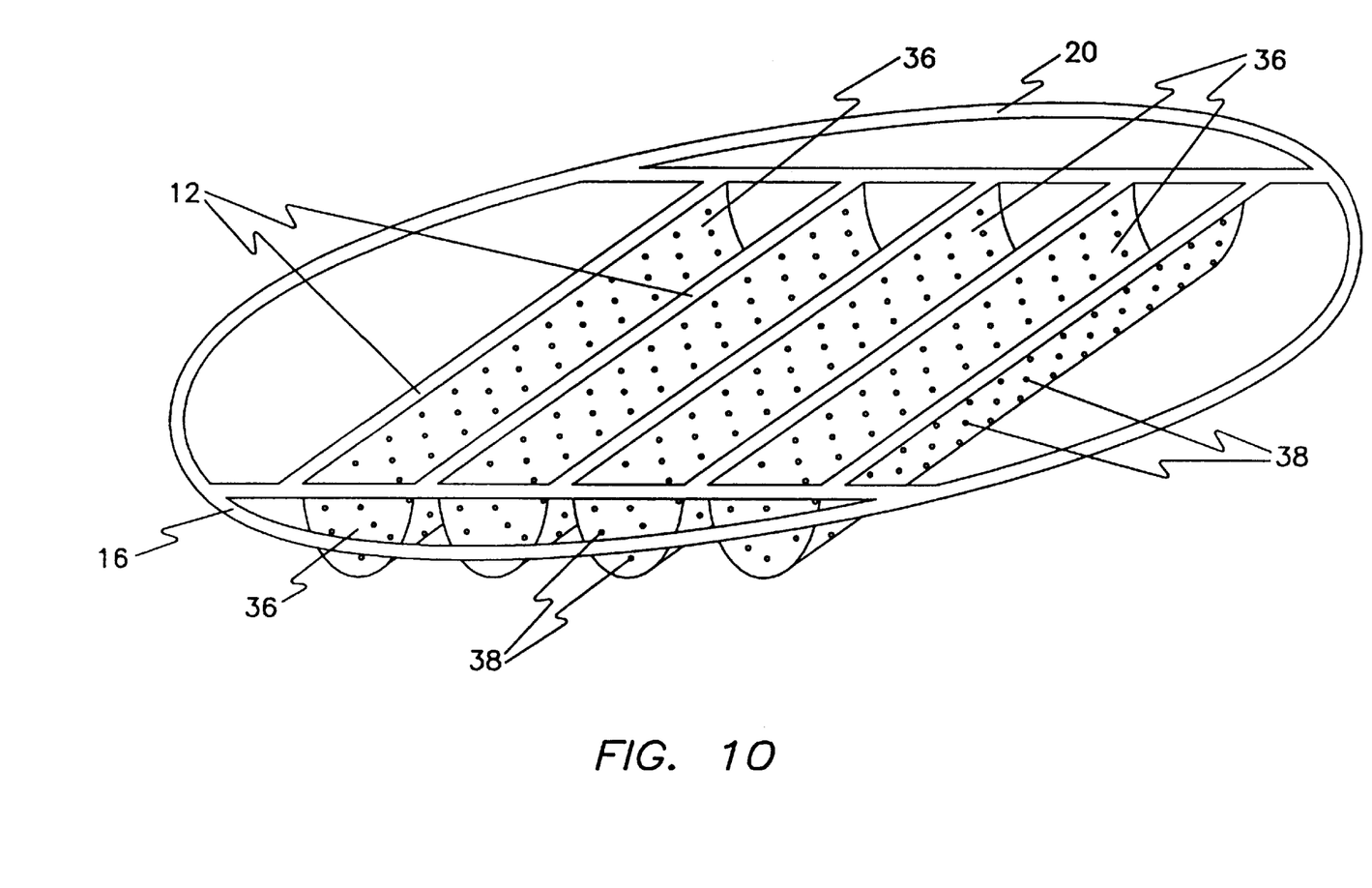
FIG. 10 shows the preferred embodiment of the two-phase small channel heat exchange matrix, including concave, perforated connecting sheets.
Figure 11:
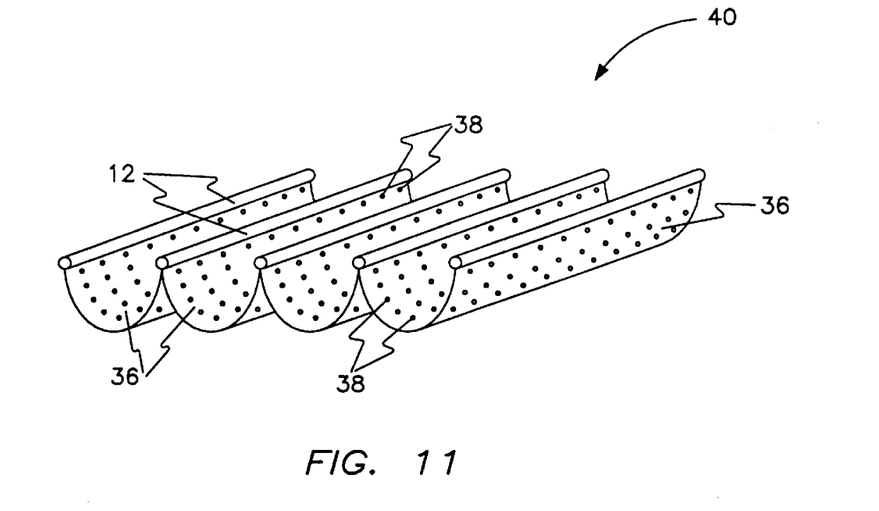
FIG. 11 shows a section of the preferred embodiment of the two-phase small channel heat exchange matrix.

FIG. 10 shows the preferred embodiment of the two-phase small channel heat exchange matrix. In this embodiment, perforated sheets 36 connect each channel 12 to an adjacent channel within the matrix. The sheets 36 are substantially the length of the channels 12, each sheet having a concave surface which serves as a trough to collect and guide the liquid descending through the column. The sheets 36 further serve as structural supports for the cooling channels 12. In operation, the liquid forms a film along the concave surfaces of the sheets 36 and the exterior surfaces of the cooling channels 12, and the vapor ascends upwardly through the perforations 38 in the sheets 36, and between the cooling channels 12. In this way, the vapor diffuses into the liquid stream. The sheets 36 increase the vapor-liquid contacting surface area for improved mass transfer between the vapor and liquid phases. Where the matrix is positioned on an incline within a separation column, the concave surfaces of the sheets facilitate the downward flow of the liquid through the column. The channels 12 are connected to inlet and outlet headers 20, 16, which are connected to coolant lines (not shown). FIG. 11 shows a section 40 of the preferred matrix, including the channels 12 and perforated, concave connecting sheets 36.

Figure 12:
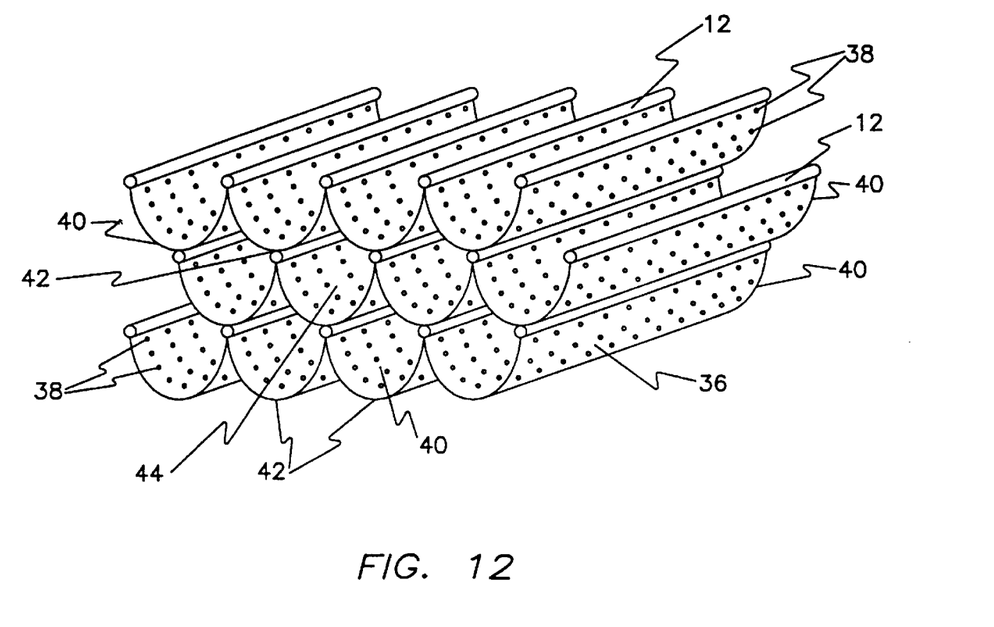
FIG. 12 shows three layers of the section of the preferred two-phase small channel heat exchange matrix as shown in FIGS. 10 and 11, arranged for placement within a separation column.

FIG. 12 shows three layers of section 40, as illustrated in FIG. 11, whereby the matrices are stacked together for placement within a separation column. The sections 40 of the preferred matrices are aligned so that the lowest points 42 of the concave, perforated sheets 36 connecting the cooling channels 12 of an upper matrix contacts the cooling channels 12 of the matrix below. Thus, vapor flows upwardly through the perforations 38 in the sheets 36 and through the vapor spaces 44 created between the matrices 40, as liquid flows downwardly along the concave surfaces of the matrices and the exterior surfaces of the cooling channels 12. In this arrangement, the lower layers are designed to support the upper layers. Also, the number of layers can be adjusted to accommodate for the requirement mass transfer surface area.

It is understood that alternate configurations of the matrix may be designed to accommodate vapor-liquid contacting structures within the column, such as packing or trays. It is further understood that the two-phase small channel heat exchange matrix can be used singly or in a series to provide sufficient vapor-liquid contacting surfaces, such that conventional vapor-liquid contacting structures are not required. The two-phase small channel heat exchange matrix can be used to provide heat transfer and mass transfer in other separations processes including, but not limited to, liquid-liquid extraction, and absorption and adsorption processes.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A method for controlling heat transfer and mass transfer at a specific location within a separation column for separating components of a multi-component mixture, comprising the steps of:

positioning a contacting element inside of the separation column, the contacting element comprising at least two channels, each channel having an internal diameter of less than about 5.0 millimeters and an external surface, whereby two phases of the multi-component mixture interface at the external surface, such that mass is transferred between the two phases;

conducting a coolant through the channels, such that heat is transferred between the two phase simultaneously with the mass transfer;

maintaining a desired uniform heat transfer coefficient along the length of the channels and across the external surface of the contacting element by selecting the coolant, such that the coolant changes between a liquid phase and a vapor phase under the temperature and pressure conditions of the separation column, and controlling the velocity of the coolant through the channels;

connecting the channels of the contacting element with perforated sheets having a concave surface to facilitate the flow of the two phases of the multi-component mixture through the separation column and to increase the surface area for mass transfer and heat transfer between the two phases;

controlling the local equilibrium conditions along the length of the separation column by providing more than one contacting element inside the separation column; and stacking the contacting elements inside the separation column, such that the concave surfaces of the contacting elements are in contact with the channels of an adjacent contacting element.

2. A small channel heat exchange matrix for use in a separation column, whereby heat transfer and mass transfer are controlled at a desired location within the separation column, comprising:

a coolant having a liquid phase and a vapor phase under the temperature and pressure conditions at the desired location within the separation column, such that the heat transfer coefficient across an exterior surface of the matrix is uniform;

a series of channels for transporting said coolant, each channel having a first end, a second end, an internal diameter no greater than about 5.0 millimeters, and a predetermined length, and each channel being spaced apart and substantially parallel to an adjacent channel;

an inlet header in fluid communication with the first ends of said channels and an outlet header in fluid communication with the second ends of said channels, whereby the series of channels define a plane between the inlet header and the outlet header;

means for transporting said coolant to the inlet header and from the outlet header, such that said coolant enters the inlet header, flows through the channels, and exits the outlet header, thereby controlling the heat transfer and mass transfer between the liquid and vapor phases of the multi-component mixture at the desired location within the separation column; and a plurality of sheets for connecting each of said channels to an adjacent channel, whereby the connecting sheets of the matrix are in contact with the channels of an adjacent matrix.

3. The small channel heat exchange matrix according to claim 2, whereby said sheets have perforations.

4. The small channel heat exchange matrix according to claim 2, whereby said sheets have a concave shape.

5. A small channel heat exchange matrix for use in a separation column, whereby the heat transfer and mass transfer is controlled at a specific location within the separation column, comprising:

a series of channels for transporting a coolant, each channel having a first end, a second end, and a predetermined length, and each channel being substantially parallel to an adjacent channel;

an inlet header in fluid communication with the first ends of said channels and an outlet header in fluid communication with the second ends of said channels, whereby the series of channels define a plane between the inlet header and the outlet header;

a means for transporting coolant to the inlet header and from the outlet header, such that coolant enters the inlet header, flows through the channels, and exits the outlet header, thereby controlling the temperature of the matrix at a predetermined height within the separation column; and a plurality of sheets, each sheet having perforations and a concave surface, said sheets connecting each channel to an adjacent channel within the matrix, wherein the concave surfaces of the perforated connecting sheets of the matrix are in contact with the channels of an adjacent matrix. concave shape.

6. The small channel heat exchange matrix according to claim 5, whereby said series of channels have internal diameters of no greater than about 5.0 millimeters.

7. The small channel heat exchange matrix according to claim 5, whereby said series of channels have internal diameters of about 2.5 millimeters.

* * * * *